(12) United States Patent
Endres et al.

(10) Patent No.: US 8,403,230 B2
(45) Date of Patent: Mar. 26, 2013

(54) CARD HAVING EMBEDDED SECURITY ELEMENT

(75) Inventors: Gunter Endres, Munich (DE); Bernd Oweger, Gmund (DE); Jurgen Karl Stahl, Munich (DE); Tobias Salzer, Unterhaching (DE)

(73) Assignee: Giesecke & Devrient GmbH, Munich (DE)

( * ) Notice: Subject to any disclaimer, the term of this patent is extended or adjusted under 35 U.S.C. 154(b) by 87 days.

(21) Appl. No.: 13/121,311

(22) PCT Filed: Sep. 29, 2009

(86) PCT No.: PCT/EP2009/007007
§ 371 (c)(1),
(2), (4) Date: Mar. 28, 2011

(87) PCT Pub. No.: WO2010/037526
PCT Pub. Date: Apr. 8, 2010

(65) Prior Publication Data
US 2011/0174884 A1 Jul. 21, 2011

(30) Foreign Application Priority Data

Sep. 30, 2008 (DE) .................. 10 2008 049 631

(51) Int. Cl.
*G06K 19/02* (2006.01)
*B42D 15/00* (2006.01)
(52) U.S. Cl. ...................... 235/488; 283/112
(58) Field of Classification Search .................. 235/487, 235/488, 491; 283/87–89, 92, 107–114
See application file for complete search history.

(56) References Cited

U.S. PATENT DOCUMENTS

| | | | |
|---|---|---|---|
| 6,165,592 A | 12/2000 | Berger et al. | |
| 2010/0270380 A1* | 10/2010 | Komarek et al. | 235/491 |

FOREIGN PATENT DOCUMENTS

| | | |
|---|---|---|
| DE | 10013410 | 9/2001 |
| DE | 102007012714 | 10/2007 |
| DE | 102006021429 | 11/2007 |
| DE | 102009031788.7 | 7/2010 |
| EP | 0684908 | 2/1994 |
| EP | 1658179 | 8/2004 |

(Continued)

OTHER PUBLICATIONS

International Search Report in PCT/EP2009/007007, Apr. 28, 2010.

*Primary Examiner* — Jamara Franklin
(74) *Attorney, Agent, or Firm* — Bacon & Thomas, PLLC

(57) ABSTRACT

The invention relates to a card (1), such as a credit card or ID card, which has several layers laminated with each other, wherein between a first card layer (21) and a second card layer (22) there is embedded a security element (2) which has a plastic or lacquer layer (4) with a relief structure (5). The relief structure has areas (5', 5") with different picture elements and produces a visible representation (6) and a hidden representation (7) which can be made visible with aids. The security element is adhesively bonded by adhesive layers (9, 10) to the two card layers (21, 22) between which it is embedded, the adhesives being chosen from the group which consists of physically drying adhesives and adhesives crosslinkable by heat, preferably water-based. Upon use of an adhesive crosslinkable by heat, the crosslinking temperature of the adhesive is lower than the softening temperature of the plastic or the lacquer layer (4) in which there is present the relief structure (5). The invention also relates to a method for manufacturing such a card.

19 Claims, 3 Drawing Sheets

FOREIGN PATENT DOCUMENTS

Figure 1:
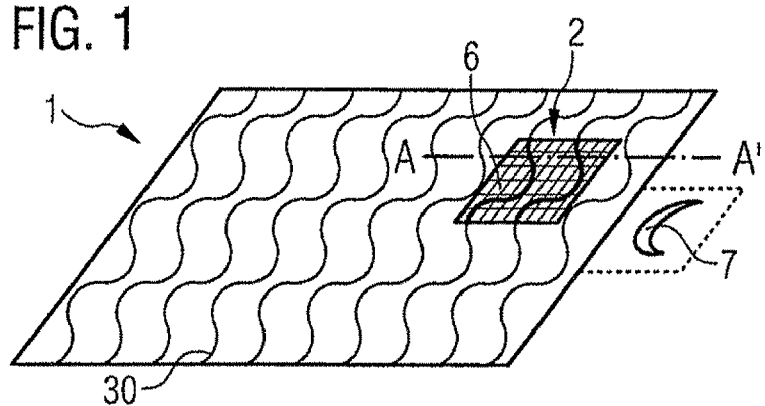

| | | |
|---|---|---|
| EP | 0013557 | 1/2008 |
| EP | 0395410 | 10/2009 |
| WO | 9411203 | 11/1992 |
| WO | 2005038499 | 4/2005 |

* cited by examiner

CARD HAVING EMBEDDED SECURITY ELEMENT

BACKGROUND OF THE INVENTION

1. Field of the Invention

The invention relates to a multilayer card, in particular credit card, bank card or ID card such as national ID document, driver's license or other identification document, which has a security element with relief structures which produce open and hidden representations, as well as a method for manufacturing the card.

2. Related Art

Cards which for different kinds of reasons represent an object of value, such as bank cards, credit cards or ID cards, must be protected against forgery. For securing such value cards against forgery, there are often employed security elements with security features in the form of relief structures, for example embossed holograms, the manufacturing of which requires a significant technological effort. One reason for the popularity of such security elements is that the optical effects yielded through the diffraction structures or refractive structures cannot be reproduced even by state-of-the-art copying machines, but can be rather simply checked by a viewer.

Mostly, the security elements having relief structures are adhesively bonded to an outer surface of the card. There are adhesive bonding techniques which make it possible for the security elements to be very durably fixed on the card surface, so that a non-destructive detaching of an adhesively bonded security element is nearly impossible. Security elements adhesively bonded to an outer surface of a card, however, upon the use of the card, are subject to heavy wear, and in particular in the case of frequently used cards or cards which are used for a very long time, such as ID cards, the relief structures suffer within a too short period of time due to abrasion and other mechanical loads in such a way that the optical effects are lost.

It was therefore attempted to embed security elements with relief structures in the interior of the cards, so that the security elements are protected from mechanical wear by card layers. However, a security element to be embedded between card layers is exposed to the effects of heat and pressure during the lamination process of the card layers, and the quality of the relief structures is impaired thereby so much that the optical effects can no longer serve as a security mark. To avoid a damage of the relief structures during the lamination process, it was proposed to expose the card areas, in which there is located a security element having relief structures, to less high temperatures and a lower pressure during the lamination. Such a method is described, for example, in EP 0 013 557 A2. Through the more careful treatment of the security element areas during the lamination, however, there is achieved only a slight improvement in terms of maintaining the quality of the relief structure, and this improvement is bought at the cost of a worse foil composite in the card areas treated more carefully, which has a negative effect on the visual recognizability of the security features of the security element, and, moreover, in the course of time can lead to a splitting of the card layers in this area.

However, special problems arise in the case of security elements which have relief structures with first and second picture elements, the first picture elements producing to the viewer first, so-called "open" picture information (representation) and the second picture elements producing to the viewer, using a suitable aid, second, so-called "hidden" picture information (representation). In the following, the first and second picture elements are also referred to as "open" and "hidden" picture elements. Upon viewing the security element, a viewer without aids can recognize only the open picture information (representation) which is produced by the interaction of the incident light with the open picture elements of the security element. But for reading out the hidden picture information of the security element, i.e. for recognizing the hidden representation, there are required specific aids. Security elements with relief structures, in particular diffraction structures, with open and hidden picture information have a very high degree of forgery-proofness. Here, one virtually has a security feature protecting an object against forgery (the open representation produced by the open picture elements), which security feature in turn is protected by an internal security feature (the hidden representation produced by the hidden picture elements) against forgery.

Security elements with a diffraction structure, which have first and second picture elements for producing open and hidden picture information, can be manufactured for example according to the methods described in WO 2005/038499 A2. With respect to security elements with first and second picture elements for producing open and hidden picture information as well as with respect to their manufacture, the disclosure of the WO 2005/038499 A2 is expressly made the subject matter of this application.

From WO 2005/038499 A2 it is known to emboss the first and second picture elements with suitable embossing heights as a relief structure in an embossable layer. From WO 2005/038499 A2 it is further known that in particular the relief structure of the second picture elements, which produce the hidden information (hidden image), is very sensitive to external influences, such as wear or crease. The sensitivity of the relief structures producing the hidden picture information is also due to the fact that these relief structures are normally extraordinarily fine so as to not impair the open picture elements of the security element and therefore not to diminish the open representation perceived by the viewer.

The normally extremely fine structures of hidden picture information, which can be characterized for example by first picture elements with an embossing depth lower than the embossing depth of the second picture elements, are not only extremely sensitive to mechanical stress such as abrasion or crease, but also to temperature loads. If security elements with diffraction structures with visible and hidden picture information are laminated into the layer composite of a card having several laminated layers, the picture elements producing the hidden representation are severely damaged or completely destroyed by the pressures and temperatures required for the lamination.

A decrease of the lamination pressure and the lamination temperature in the area of the security element, as described in EP 0 013 557, leads, as already explained, to a poorer foil composite in this area and impairs the visual recognizability of the security features of the security element, in particular the detectability of the hidden representation, insofar as this has not yet been destroyed despite the more careful treatment.

Doing without the lamination into the interior of the layer composite of a card does not solve the problem either. Security elements which are adhesively bonded substantially without pressure and temperature load to an outer surface of a card, offer less protection against forgery, since, in contrast to a laminated security element, they can possibly be removed. Furthermore, because of the lack of protection by a card foil, such security elements are exposed to increased wear, which may lead to the fact that the hidden picture information soon cannot be detected, i.e. made visible with aids, any longer.

So there is the problem that with the current methods of the prior art it is not possible to mount a security element with first and second picture elements, which produce open and hidden picture information, on a card such that it cannot be removed without damage, and the sensitive structures are neither damaged by the application method of the security element nor through extended use of the card and are well visible or well detectable. The seemingly insoluble dilemma is: for a high degree of forgery proofness, hidden picture information is desirable and the lamination of the security element into the card's layer structure is required. Under lamination conditions, the fine structures of the hidden picture information are regularly destroyed. On the other hand, particularly careful lamination conditions impair the visual recognizability or detectability of the security features and the composite strength of the security element in the layer structure of the card.

It is therefore the object of the present invention to provide a card with several layers laminated with each other and with a security element which a security feature on the basis of relief structures, in particular diffraction structures, with first, open and second, hidden picture elements, which produce a first, open and a second, hidden representation (picture information), which card has a high degree of forgery proofness.

It is furthermore the object of the present invention to provide such a card, wherein the security element has a high composite strength in the layer structure of the card.

It is further the object of the present invention to provide such a card, wherein there is guaranteed a good visual recognizability of the security features of the security element, and in particular a good detectability of the hidden picture information.

It is moreover the object of the present invention to provide a method for manufacturing such a card.

SUMMARY OF THE DESCRIPTION

Cards within the meaning of the present invention are documents which have several, i.e. at least two layers laminated with each other, and which are to be protected against forgery by means of a security element. Accordingly, the term "card" in principle also comprises composite bank notes, in particular with at least two layers of paper, paper-like materials and/or plastic materials laminated with each other. The term "foil composite bank note" used in the following within the context of the present invention relates to composite bank notes with at least one, preferably more foil layers of a plastic material.

Typically, cards according to the invention do not consist only of two layers, but of one or more core layers, which are covered on the outer surfaces of the core layer or of the core layer structure in each case by one or more cover layers (overlay foils). The core layers are preferably opaque, so that the card altogether is not transparent, while the cover layers are preferably transparent, so that security elements and information to be mounted on the card can be mounted such that they are protected by a cover foil and yet are well recognizable. A larger number of layers further has the advantage that the card, whose total thickness is standardized, consists of single layers of a thickness which can be processed without problems. The card layers are preferably made of plastic foils, for example of polycarbonate, of polyethylene terephthalate or other polyester, or of polyvinyl chloride. The card layers are laminated with each other under elevated pressure and/or elevated temperature.

According to the invention, the security element in principle can be embedded between any layers within the layer structure of the card. Of course, the card foils covering the security element have to be transparent, at least in the area of the security element so as to ensure the visibility of the security element. Preferably, the security element is covered by only one single transparent cover foil.

The security element has at least one security feature in the form of a relief structure. Relief structures are diffraction structures or refractive structures, i.e. structures which diffract or refract the electromagnetic radiation, in particular visible light. Diffraction structures are preferred and particularly preferred are holograms, kinegrams, moviegrams, pixelgrams and other structures which have optical diffraction effects. Relief structures as well as their production are known.

In the following, in connection with the relief structure and its manufacturing mostly the terms "diffraction structure" or "hologram" and "embossing" are mentioned, as these are the currently most preferred embodiments. This, however, is not to be understood as a restriction. The invention comprises any relief structures, in particular also so-called matt structures with achromatic scattering effects, as well as manufacturing methods suitable therefor.

The relief structure or diffraction structure of the security element to be used according to the invention has the peculiarity that it is a "double structure", i.e. a relief structure or diffraction structure is disposed or embossed within or in subordinate surface areas of another relief structure. In the context of this application "subordinate surface areas" refer to those surface areas of the first relief structure, which are of secondary importance for the production of the open representation, as this is described in WO 2005/038499 A2. In the following, the formulation "arrangement in subordinate surface areas" is understood as covered by the term "within" another (first) relief structure. The first diffraction structure produces a representation visually recognizable without aids to a viewer, while the second diffraction structure embossed within the first diffraction structure produces a hidden representation not visually recognizable without aids to a viewer.

Diffraction structures with both visible and hidden representations are in principle known. A hidden representation within a visually recognizable representation, such as a visible hologram, is producible for example by providing additional embossings in an embossed hologram. These additional embossings are normally extraordinarily fine and formed such that only with suitable aids, such as a laser as a radiation source, they produce a "hidden" representation detectable for a viewer.

In principle it should be noted that the areas of the first embossing (first picture elements) and the areas of the additional embossing (second picture elements) can also completely coincide, i.e. the (second picture elements) are disposed substantially in the whole area of the first picture elements in the plastic or lacquer layer of the security element. Such a security element produces in the whole area of the embossed plastic or lacquer layer open picture information and with a suitable aid hidden picture information. Moreover, all arrangements of first and second picture elements described in WO 2005/038499 A2 are conceivable.

A method for manufacturing such a diffraction structure which has first areas and second areas, the first areas producing a first representation visually recognizable under ambient conditions, and the second areas producing a second representation not visually recognizable under ambient conditions, is also disclosed in DE 10 2007 012 714 A1, to which reference is made herewith. According to this print, the embossing depth of the second picture elements can advantageously be smaller than the embossing depth of the first picture elements.

In the method, the hologram structure, i.e. the double structure, is first produced in a photoresist plate, with the help of the developed photoresist plate there is manufactured an embossing matrix, and with the help of the embossing matrix there is manufactured a security element with visible and hidden picture information. The embossing of the hologram into a security element is effected by per se known methods. A preferred method is the embossing into plastic foils or lacquer layers, as it is described e.g. in EP 0 684 908 A1, to which, with regard to materials and method, reference is expressly made. As materials for the diffraction structure layers there are particularly preferred radical and cationic curing UV lacquers.

The hidden representation can be made visible for example as a virtual picture by irradiation with divergent monochromatic light, such as it is supplied by a conventional laser pointer, as described in DE 10 2007 012 714 A1, or by irradiation with a light source, such as a laser pointer, and projecting the reflected radiation onto a projection screen or collection screen, as described in WO 2005/038499 A2.

The security element in its simplest version consists only of the plastic foil or lacquer layer with the embossed diffraction structure. For the better recognizability of the diffraction structure, it is preferred to apply onto the diffraction structure a reflecting coating. Suitable coatings are for example metal layers which are preferably applied by physical vapor deposition. The metallizations may have gaps in the form of patterns, characters or codings, a so-called "negative writing". The term "negative writing" used in this application comprises gaps of any form, i.e. any non-allover-ness in a substantially non-transparent coating. The negative writing can thus have the form of, for example, letters, numbers or patterns of any kind, in particular line patterns. Instead of metallizations, there may also be provided layers of metallic effect inks, or highly refractive layers of materials such as $CaS$, $CrO_2$, $ZnSi$, $TiO_2$ or $SiO_x$.

Preferably, over the metallization or other reflecting layer there is applied a protective lacquer layer. Alternatively, a protective lacquer layer with high refractive index may replace a reflecting layer.

Preferably, the security element has at least one further feature layer. In principle, there are suitable all feature layers and layer combinations which are known for security features. As further feature layer there are particularly preferred a layer with color-shift effect, in particular a thin-film structure, and a light-polarizing layer, in particular a layer with nematic liquid crystals, and in a very particularly preferred embodiment the security element has, besides the diffraction structure which produces a visible and a hidden representation, both a layer with color-shift effect as well as a light-polarizing layer. The layer with color-shift effect is connected with a further feature layer of the security element preferably by means of a lining layer of a usual lining adhesive.

Security features with color-shift effect, i.e. security features whose color changes upon the change of the viewing angle, can be manufactured in various ways, for example by printing with printing inks having liquid crystal polymer pigments or iriodines. In the present invention there are preferably used thin-film elements. The color effect here is based on interference effects due to multiple reflections in the various partial layers of the thin-film element and is described for example in EP 0 395 410 A2. Thin-film elements are typically built up of an absorber layer, a reflection layer and a dielectric layer disposed between the absorber layer and the reflection layer. A thin-film structure with a dielectric layer relatively simple to produce is described in EP 1 658 179 B1. In the document there are also specified suitable materials for the reflection layer and the absorber layer.

Light-polarizing feature layers, so-called "polarization features", are security features which use polarization effects for securing the authenticity. Light-reflecting surfaces, for example metallized holograms, are coated with a "phase delay layer". Phase delay layers are able to change the polarization and phase of light going through. A security element which uses polarization effects for securing the authenticity is described for example in DE 10 2006 021 429 A1. Upon viewing under ambient light, the areas with phase delay layer of such a security element are hardly perceptible, upon viewing under polarized light, however, i.e. for example upon viewing through a suitable polarizer, the areas with phase delay layer become recognizable.

In the present invention, the light-polarizing layers are preferably manufactured from liquid crystalline material, especially preferably from nematic liquid crystals. In order to bring to bear the optical effects, the liquid crystalline materials should be aligned. It is therefore preferred to use a suitable alignment layer as a carrier for the light-polarizing security feature. As alignment layers there are suitable, for example, finely structured layers which can be manufactured by embossing, etching or scratching, layers of linear photopolymer or layers aligned by the exertion of shearing forces.

All security features of the security element can be formed all-over or in certain areas. Preferably, the security features form figurative or geometric patterns or motifs.

The reason why security elements with additional security features with light-polarizing effects and color-shift effects are preferred is that, on the one hand, additional security features considerably increase the forgery proofness and on the other hand and in particular that they are security features whose visual recognizability is typically impaired by embedding the security element in the layer structure of a card.

In the present invention, however, such impairment does not occur. This is due to the special kind of the embedding of the security elements in the foil structure. According to the invention, namely, the security element, which preferably has the form of an areal element such as a foil strip or a foil patch, is adhesively bonded to both card layers, between which it is embedded, by means of a stabilizing adhesive. Suitable adhesives are physically drying adhesives and adhesives crosslinkable by heat, especially water-based adhesives crosslinkable by heat. "Physically drying" means that the drying takes place by the evaporation of the solvent and without chemical reaction. If an adhesive crosslinkable by heat is used, the crosslinking temperature of the adhesive should be lower than the softening temperature of the plastic foil or of the lacquer layer of the security element, in which there is present the diffraction structure. It should be further noted, that physically drying adhesives sometimes may also cure to a certain extent by chemical reaction. I.e., in practice there are also known adhesives which are substantially physically drying, but moreover are also crosslinkable by heat and vice versa.

Suitable physically drying adhesives are based for example on polyester resins, such as e.g. the polyester resin Dynapol L 208 (Degussa), solvent-containing, physically drying adhesives being particularly preferred.

Suitable adhesives crosslinking by heat are based for example on acrylates, in particular polyurethane acrylates, adhesives post-crosslinking by UV or heat radiation being particularly preferred.

As already mentioned, an exact distinction between physically drying adhesive systems and adhesive systems crosslinking by heat is not always possible, so that here again, in summary, suitable adhesive systems crosslinked physically and/or by heat are listed. In the context of the present invention, there can be used aqueous-based or solvent-based adhesives of the following chemical classes: polyesters, polyacrylates, urethane resins, methacrylates, isocyanates, blocked isocyanates, polyvinyl chlorides (PVC resins), polyvinyl butyrals (PVB resins), polyamides, ketone resins, maleinate resins, dual-cure resins, ionomer dispersions, alkyd resins, phenolic resins, etc.

Particularly suitable are further the adhesives disclosed in the unpublished German patent application DE 10 2009 031 877.1, which as a component contain at least one anti-blocking agent in powder form and optionally at least one further film-forming component, whereby the anti-blocking agent can be activated by heat and/or radiation and/or mechanical action and after the activation is able to undergo a chemical reaction with a component of the adhesive and/or with itself. After the activation of the anti-blocking agent, the anti-blocking agent is able to undergo a chemical reaction with one of the main surfaces of the security element and/or a card layer, in order to securely embed the security element between the card layers by adhesively bonding. All adhesives disclosed in DE 10 2009 031 877.1 can be advantageously employed for embedding the security element described in the present application in a card, and therefore make possible the manufacturing of a card according to the invention of this application. With regard to the adhesives described in DE 10 2009 031 877.1 and their advantageous effects, the disclosure content of the DE 10 2009 031 877.1 is expressly made the subject matter of the present application.

The technical reason why the adhesive bonding of the security elements by means of these adhesives improves the visual visibility or detectability of the optical security features and prevents a damage by the lamination process has not yet been finally clarified. In any case, the improvement achieved in particular in the detectability of the hidden picture information compared to not adhesively bonded, but otherwise identical, laminated security elements is dramatic, and also the visual recognizability of the other mentioned optical effects is significantly improved.

The improvement of the layer composite in the area of the security element achieved by the adhesive bonding is also very advantageous. By adhesively bonding the security element to the neighboring card layers by means of the said adhesives it is possible to apply lower pressures and/or temperatures in the area of the security element upon the lamination. Still, a good layer composite is achieved, so that even in the case of prolonged use of the card there occurs no splitting of the card layers in the area of the security element by bending loads, and at the same time one notices a clearer visibility or detectability of the optical effects. However, it is explicitly pointed out that the clear recognizability or detectability of the optical effects of the security element is also obtained even if in the area of the security element there are not applied more careful lamination conditions.

Thus, a security element with security features ensuring a high degree of forgery proofness can be embedded in the layer structure of a card and thus be protected against mechanical wear and against a possible removal, while at the same time there can be achieved an excellent composite strength of the security element in the layer structure of the card and an improved visibility or detectability of the optical security features, which again increases the forgery proofness.

It should be noted that one or both adhesive layers can be partially or completely replaced by a lacquer layer which matches the refractive indices of the respective neighboring layers (e.g. security element and card layer) (so-called "index match"). Such lacquer layers are per se known to the person skilled in the art, for the reason of which they are not explained in more detail here. The partial/complete replacement of an adhesive layer by such a lacquer layer for the matching of the refractive indices of adjacent layers makes it possible for an object according to the invention to be manufactured with numerous above-described advantageous effects, but is currently not preferred.

According to a particularly preferred embodiment, for the plastic foil or the lacquer layer of the security element, in which the diffraction structure is present, there are chosen materials whose softening temperature is higher (e.g. at least 10° C. higher) than the softening temperature of the card layers between which the security element is to be embedded. At least, the softening temperature of the plastic foil or of the lacquer layer with the diffraction structure should be at least as high as the softening temperature of the card layers between which the security element is to be embedded.

Prior to the application of the adhesive, it may be advantageous to apply a primer to the surface or surfaces to be adhesively bonded in order to improve the adherence properties. The primer can be additionally used to provide the card with further feature substances which are included in the primer. Like the primer, one of the adhesive layers or both adhesive layers may contain additional feature substances. Suitable feature substances are in particular luminescent substances, preferably luminescent substances which are visible only under UV light or IR light and in ambient light cannot be perceived by a viewer. Feature substances in the primer layer and in particular the adhesive layer have the advantage that upon attempts to detach the security element from the layer composite, they remain partly on the security element and partly on the card. This means an increase in forgery proofness.

A further improvement of the forgery proofness can be achieved by providing a coating on one of the card layers neighboring the security element. Preferably, the transparent card foil covering the security element, i.e. lying outside in the finished layer structure of the card, before lamination is coated on its inner surface. The coating is preferably a printed layer which contains dyes and/or feature substances. Preferred feature substances are luminescent substances, there being suitable both luminescent substances perceptible under ambient light and luminescent substances visible only under UV light or IR light. The dyes and/or feature substances preferably form a continuous pattern which extends over the security element and the other areas of the card. The pattern can also be provided only in certain areas, whereby the coated area of the card foil must at least partly overlap with the security element. Thus, the viewer recognizes a continuous pattern which also extends over the security element. Manipulations of the card thus become recognizable at first glance because there are dislocations in the lines of the pattern.

The security element preferably has the form of a strip or patch. Strips typically have a width of several millimeters, foil patches or other areal security elements have an area in the range of approx. 0.5 cm² up to several square centimeters. Thicknesses range from 1 μm to about 100 μm, thicknesses from 5 μm to 50 μm being preferred. In this preferred thickness range, the security elements are already relatively stable and therefore easy to handle, yet at the same time still easy to integrate in the layer structure of the card. In the case of thicker security elements, in particular security elements having a thickness of more than 100 μm, it is preferred to provide at that point of the card where the security element is to be integrated, in one or more card foils, corresponding gaps or recesses. An alternative to the mounting of thicker security elements in a gap is to provide the security element with a supporting layer. Such a supporting layer may be a plastic foil, which at the same time is used as a core layer of the card layer structure, i.e. extends over the entire surface of the card.

The core layer or the core layers of a card are typically opaque or provided with a print, so that they become non-transparent. Interesting optical effects can be achieved, when in the area in which there is located the security element the card is transparent or at least translucent. In this case, the optical effects are recognizable from both sides, depending on the layer structure of the security element there being observed the same or different effects. If the security element has an opaque layer with interruptions, for example a metal reflection layer with interruptions in the form of characters or patterns, these interruptions can be checked in transmitted light, thereby achieving an additional security effect.

Cards according to the invention are manufactured as follows: At first, security elements are manufactured, as they were described above, preferably in the form of transfer elements on a continuous web having a plurality of transfer elements. Transfer elements and transfer element webs or -bands are per se known. It is characteristic of transfer bands that the security elements are prepared on a carrier layer which has a layer structure in the reverse layer order as to be later present on the object to be protected. After the transfer, the carrier layer is either pulled off from the layer structure of the security element, or it remains as a protection layer on the security element. In the present invention, in which the security element is embedded between two card layers, the carrier layer is removed.

The security element to be used according to the invention has as a security feature at least the mentioned diffraction structure with first and second picture elements which produce an open and a hidden representation (picture information), preferably also further feature layers, in particular a layer with color-shift effect, such as a thin-film structure, and/or a light-polarizing layer, such as a layer of nematic liquid crystal material. Preferably, these feature layers form a pattern or motif. The diffraction structure is preferably provided with a metallization which according to a particularly preferred embodiment has interruptions (negative writing) which form for example characters or geometric or figurative patterns.

The security elements have, as they are areal elements, two large, compared to their faces, surfaces, in the following referred to as "main surfaces". On one of the main surfaces there is applied a physically drying adhesive or an adhesive crosslinkable by heat, in particular water-based, preferably by gravure printing process, where appropriate, on a primer layer applied onto the main surface of the security element before. In the case of a security element which is formed as a transfer element, the adhesive is applied of course onto the main surface on which there is no transfer substrate. Then the security element is adhesively bonded to a card layer, whereby there can also be applied a suitable primer onto the respective card layer before. In the case of an adhesive crosslinkable by heat, the adhesive bonding is effected under elevated temperature, for example between two heated plates or rollers which at the same time exert a slight pressure on the material to be adhesively bonded. In the case of a physically drying adhesive, after the adhesive bonding the adhesive is allowed to dry for a sufficiently long time. In the case of transfer elements, immediately after or preferably during the adhesive bonding the transfer substrate is pulled off.

Subsequently, a second adhesive layer, also made from a physically drying adhesive or an adhesive crosslinkable by heat, particularly water-based, is applied onto the not adhesively bonded main surface of the security element. Alternatively, this adhesive layer can also be applied onto the card layer which in the finished card covers the security element. The adhesive should be applied here at least in an area which corresponds to the surface of the security element. Preferably, the surface of the adhesive on the card foil is slightly larger than the corresponding main surface of the security element to be adhesively bonded. According to a further alternative, the adhesive layer can also be applied all-over onto the card surface. Before the application of the adhesive, a primer may be applied in each case.

Then the security element is adhesively bonded to the cover layer or a cover layer of the card. Subsequently or at the same time, the two card layers, between which the security element is embedded, are connected to each other. For connecting the two card layers there can be used conventional lining methods. In the case of an adhesive crosslinkable by heat, it is preferred to carry out the adhesive bonding of the security element with the card cover layer and the connecting of the two card layers in one step, whereby in the area of the security element there can be applied a lower temperature and/or a lower pressure than in the other areas of the card. The temperature must be high enough of course also in the area of the security element in order to initiate the crosslinking of the adhesive.

In the case of a physically drying adhesive, the security element is first adhesively bonded to the card cover foil or a card cover foil, the adhesive bonding is allowed to dry sufficiently long, and a conventional lining process is then carried out for connecting the card foils. Since the security element is already adhesively bonded with the card cover foil, in the area of the security element there can be applied a lower temperature and/or a lower pressure. According to a special embodiment, the adhesive is applied all-over onto the card cover foil which in the finished card covers the security element. In the case of adhesives crosslinkable by heat, in this manner there is possible a connection of the card foils under low pressure and at a temperature which is sufficient for initiating the crosslinking of the adhesive. In the case of physically drying adhesives, the connection of the card foils with the security element lying in between can be carried out without increasing the temperature.

Regarding the connection with the other card foils, the process is as follows: either first the security element is adhesively bonded onto a first card foil and then this card foil is laminated with the adhesively bonded security element and all further card foils to jointly form a layer composite, or first a foil composite is manufactured, whose top foil is the card foil to be adhesively bonded to the security element, thereon the security element is adhesively bonded, and thereon then the still missing foil or the still missing foils is (are) lined.

According to a preferred embodiment of the card according to the invention, the card cover foil is provided, preferably printed, before lamination, on its surface, which is on the inside in the finished card, with a pattern which in the finished card covers at least partial areas of the security element and adjacent partial areas of the cover foil. If the security element is covered with more than two card cover layers, preferably that card cover layer is printed which is to be adhesively bonded with the security element. Attempts to separate security element and cover foil thus lead to the fact that on both the security element and the cover foil there are recognizable traces of the pattern. Besides, attempts of newly combining security element and card foils would lead to dislocations in the pattern lines. Such patterns are preferably printed on by means of conventional printing inks, alternatively also by means of printing inks with luminescent pigments.

In the following the present invention is still further illustrated with reference to Figures. It is pointed out that the Figures are not true to scale and true to proportion. In particular, all layer heights are represented greatly exaggerated. Moreover, features described in the context of a certain Figure are not restricted to the specific feature combination described in that Figure, but can be combined with other features described in other Figures or in the general part of the description.

Figure 2A:
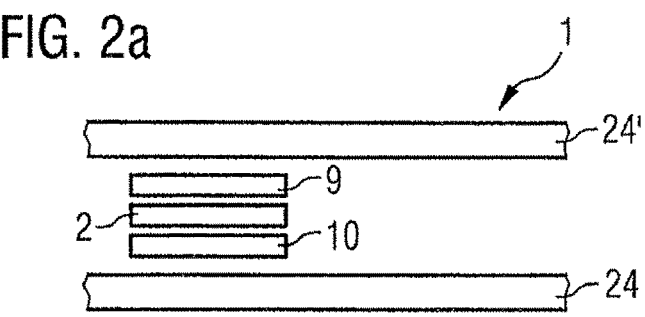
Figure 2B:
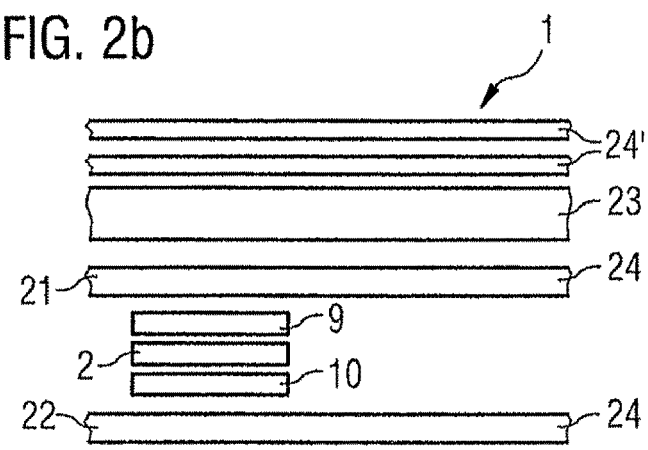
Figure 2C:
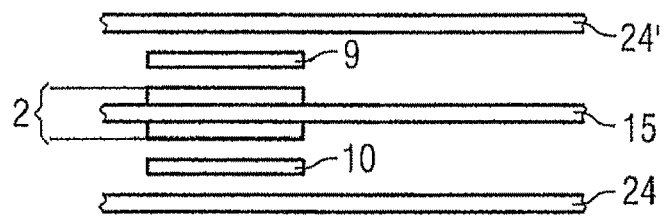
Figure 3:
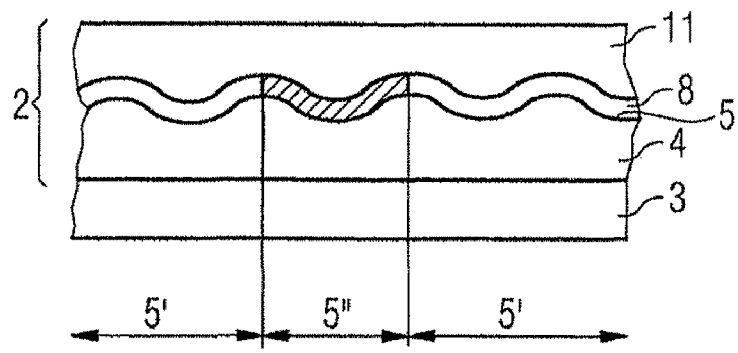
Figure 6:
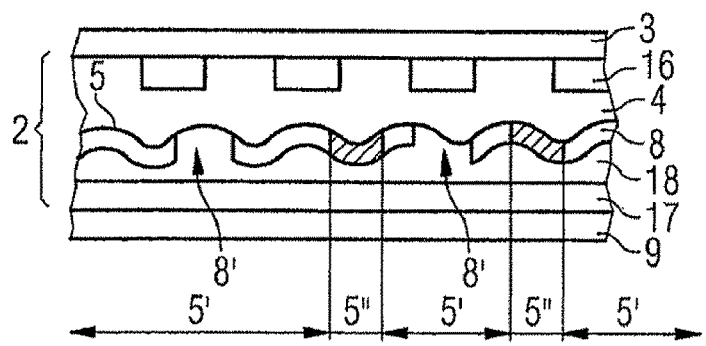
Figure 7:
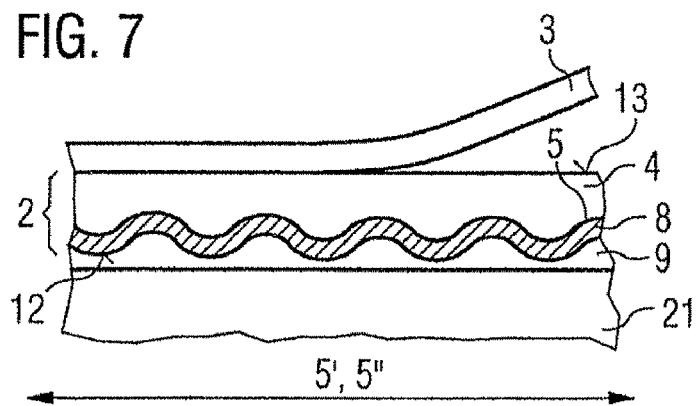
Figure 8:
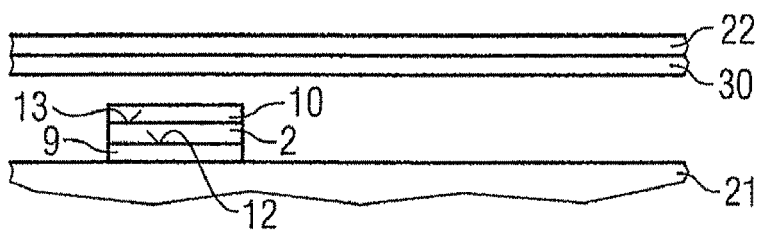
Figure 9:
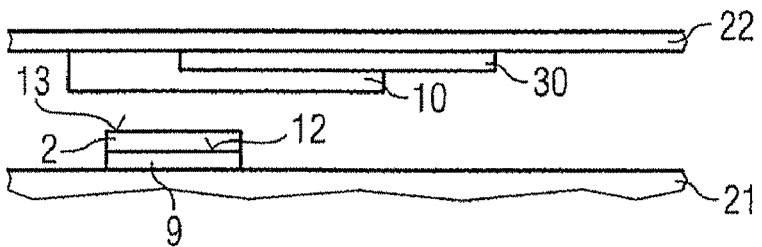

FIG. 1 shows a top view of a card according to the invention with an embedded security element which produces to a viewer an open and a hidden representation (picture information);

FIG. 2a, 2b, 2c in each case show sectional views of different exemplary card structures, which illustrate possible arrangements of a security element in the card structure;

FIG. 3, 4, 5 in each case show sectional views of a security element which is to be embedded in a card according to the invention, along the line A-A' in FIG. 1;

FIG. 6 shows a sectional view of a particularly preferred embodiment of a security element as it is to be embedded in a card according to the invention, along the line A-A' in FIG. 1; and FIG. 7, 8, 9 in each case show sectional views along the line A-A' in FIG. 1, which illustrate the manufacturing stages of a card according to the invention, FIG. 7 showing the transfer process of a security element onto a first card layer, and the FIGS. 8 and 9 in each case showing alternative adhesive bonding variants with a second card layer, a card cover layer.

FIG. 1 shows a card according to the invention in top view. The card 1 has an embedded security element 2. The security element 2 has a diffraction structure, which produces a representation 6 visually recognizable under ambient conditions, in particular when exposed to light in the visible wavelength range, here a diamond pattern, as well as a representation 7 not visually recognizable under ambient conditions, here a moon. The representation 7 is indicated in FIG. 1 as a virtual picture, the representation 7 normally also being projected, using a suitable light source, e.g. a laser with laser light in the red wavelength range, onto a suitably formed ground glass screen. In addition, the card 1 shows a design print 30 which extends in the form of a wave pattern over the entire card surface including the security element 2. The design print 30 is printed, not recognizable in FIG. 1, on the in the card structure inner surface of the card's cover layer covering the security element.

The FIGS. 2a, 2b and 2c show sectional views through exemplary card structures. There is shown in each case the state before lamination or adhesive bonding, i.e. between the individual layers there are distances which in the finished card, of course, will no longer be there. FIG. 2a shows the simplest version of a card 1 according to the invention. The card 1 consists of only two cover foils 24 and 24' between which the security element 2 is embedded. The security element 2 is adhesively bonded by means of the adhesive layer 9 to the cover foil 24' and by means of the adhesive layer 10 to the cover foil 24. The card 1 according to FIG. 2a may obviously also be a composite bank note which, as already mentioned, is comprised by the term "card". The same applies to the below explained embodiments according to FIGS. 2b, 2c, 8 and 9.

Cards according to the invention usually consist of a plurality of layers, as shown in FIG. 2b. In the embodiment according to FIG. 2b the structure of the card 1 consists of an opaque core layer 23 which on each side has two cover layers 24, 24'. A security element 2 is adhesively bonded by means of an adhesive layer 9 to a first card layer 21 and by means of a second adhesive layer 10 to a second card layer 22. In the embodiment example, the first card layer 21 and the second card layer 22 are the cover layers 24. The second card layer 22 must be transparent at least in the area of the security element 2, so that the security element is recognizable. Alternatively, the security element 2 could also be embedded, for example, between the card layer 21 and the core layer 23, then, accordingly, the layer 21 must also be transparent. If also the core layer as well as the two cover layers 24' are transparent at least in the area of the security element 2, the optical effects of the security element can be observed from both card sides.

A further embodiment of the card 1 according to the invention is shown in FIG. 2c. This card consists of two cover layers 24, 24' between which a security element 2 is embedded. The security element has a supporting layer 15 which extends over the entire surface of the card 1 and serves as a core layer of the card. Instead of the layers 24 and 24', such a card normally has several layers.

In the case of thick security elements, i.e. security elements with a thickness of more than 50 μm and in particular more than 100 μm, one or also more layers of the card, depending on the thickness of the security element, should have recesses or gaps in the area of the security element to be embedded, in order to ensure a complete connection of the layers without impairment of the optical effects of the security features of the security element 2 by a "flow" of card foils occurring during the lamination process. If the security element 2 has a supporting layer, as shown in FIG. 2c, normally, even with thick security elements, no such recesses or gaps are required.

At this point, it shall be pointed out once again that as an adhesive for all objects claimed and disclosed in the present application, the adhesive disclosed in the unpublished German patent application DE 10 2009 031 877.1 can be advantageously used. For example, FIG. 4 and the associated description of the DE 10 2009 031 877.1 recognizably discloses an ID card in which a security element is laminated with two adhesive layers (4, 4') in between two card substrates (10, 10'), as this, according to the present invention, is analogously realized for the security element (2), the adhesive layers (9, 10) and the card substrates (24, 24'), e.g. of the cards according to FIGS. 2, 8, and 9.

FIG. 3 shows a sectional view through an embodiment of a security element that is intended to be embedded in a card 1 according to the invention. The security element 2 is formed as a transfer element. On a transfer substrate 3 there is an embossing lacquer layer 4 which preferably consists of a radical or cationic curing UV lacquer. Into the embossing lacquer layer 4 there is embossed a diffraction structure 5. The diffraction structure 5 has two areas with embossed structures different from each other. The first areas 5' have a first embossing (first picture elements) and second areas 5", in which there is located an additional embossing (second picture elements). The second embossing in the form of the second picture element is thus located within the first embossing, whereby, as already mentioned, the term "within" also comprises the embodiments described in WO 2005/038499 A2, in which the second picture elements are disposed in the subordinate surface areas of the first picture elements, which are of secondary importance for the representation of the open picture information. The second embossing is represented in FIG. 3 and the following Figures as a hatching. It should be noted that in principle the first relief areas 5' and the second relief areas 5" may also completely coincide, i.e. the first embossing (first picture elements) and the second embossing (second picture elements) are disposed substantially congruently in the plastic or lacquer layer 4 of the security element. Such a security element produces in the entire area of the embossed plastic or lacquer layer open picture information and with a suitable aid hidden picture information. The above statements about the overlap of first and second relief areas apply to all embodiments described in this application and are shown and explained by way of example in FIG. 7. Conversely, the first and second picture elements can also be disposed not overlapping, i.e. disposed substantially side by side. In the embodiment of the FIG. 3 there would then be disposed, for example, the first picture elements substantially exclusively in the relief area 5' and the second picture elements substantially exclusively in the relief area 5", or vice versa.

The first embossing shown in FIG. 3 is formed by first picture elements and produces a first representation 6 (the diamond pattern in FIG. 1) visually recognizable under ambient conditions, e.g. light of the visible wavelength range, and the second embossing produces a second representation 7 (the moon in FIG. 1) not visually recognizable under ambient conditions. In principle, such a security element, which consists only of an embossing lacquer layer 4 with embossed diffraction structure 5, already represents a security element 2 suitable for the embedding in a card according to the invention. In practice, the security element 2 has further layers, such as a metallization 8 which can be applied for example by physical vapor deposition onto the diffraction structure 5. The metallization 8 can also be replaced by a suitable highly refractive layer, for example from ZnSi or $TiO_2$. In the shown embodiment, the security element in addition has a protective lacquer layer 11, whereby protective lacquer layers with high refractive index can also replace the reflecting layer, in FIG. 3 the metallization 8. The embossing lacquer layer 4 may serve as a release layer. Alternatively, between the transfer substrate 3 and the embossing lacquer layer 4 there can also be provided an additional release layer.

Figure 4:
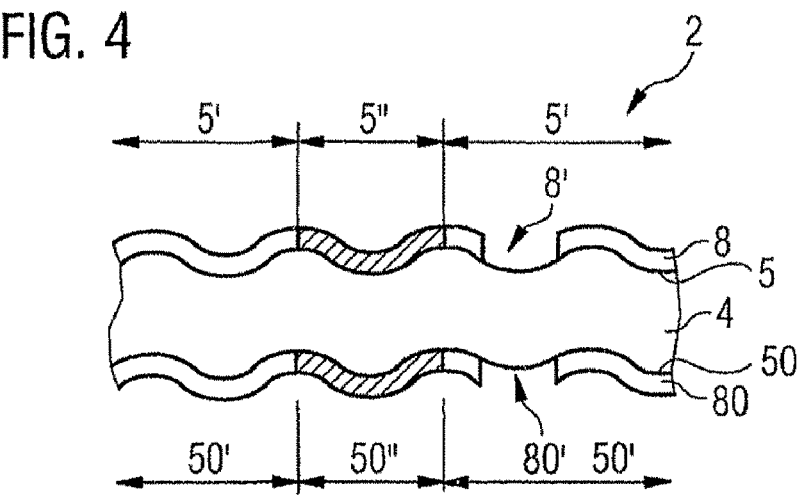

FIG. 4 shows a sectional view through a further embodiment of a security element 2, which is intended to be embedded in a card 1 according to the invention. The security element has a plastic foil 4 which on its surfaces is provided with diffraction structures 5 and 50. The diffraction structures 5, 50 can be the same or different. The diffraction structure 5 has first areas 5' with first picture elements and second areas 5" with second picture elements. The diffraction structure 50 has first areas 50' with first picture elements and second areas 50" with second picture elements. The embossing depth of the second picture elements in the second areas 5", 50" may be less than the embossing depth of the picture elements in the first areas 5', 50'. Such mutually opposing relief structures can be produced at the same time by the foil to be embossed being guided through the gap of two mutually opposing embossing cylinders. The relief structures 5, 50 are provided with metallizations 8, 80 in each case. The metallization 8 has interruptions (negative writing) 8', and the metallization 80 has interruptions (negative writing) 80', the interruptions 8', 80' being congruent. When such a security element is disposed in a card structure which in the area of the security element is transparent, the interruptions 8', 80' can be checked in transmitted light. The areas 5', 50' are also represented congruently in the Figures, which, however, is not mandatory.

Figure 5:
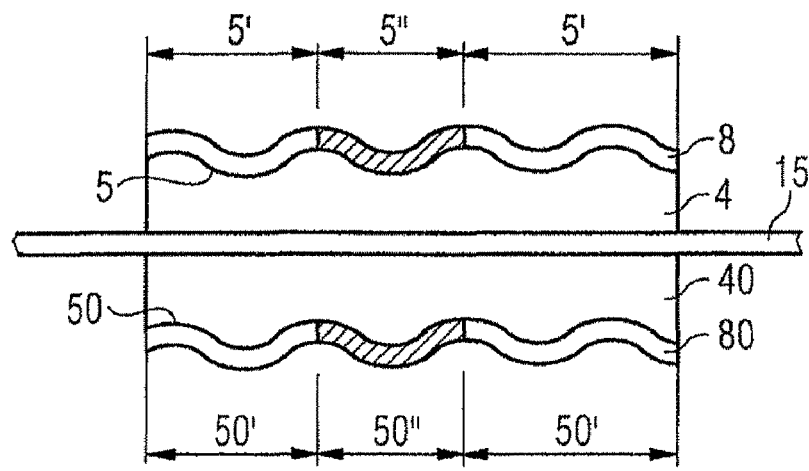

FIG. 5 shows a sectional view through a further embodiment of a security element 2, which is intended to be embedded in a card 1 according to the invention. This security element 2 has a supporting layer 15 which is coated on both sides with an embossing lacquer layer 4, 40. In the embossing lacquer layers 4, 40 are embossed relief structures 5, 50 in each case, as they have already been described several times. On the relief structures 5, 50 there are located metallizations 8, 80 in each case. The supporting layer 15 preferably has the dimensions of the card 1 in which the security element 2 is to be embedded. It may serve at the same time as card core layer.

FIG. 6 shows a sectional view through a particularly preferred embodiment of a security element 2 which is intended to be embedded in a card 1 according to the invention. The security element 2 is formed as a transfer element and thus has a transfer substrate 3. On the transfer substrate 3 there is located a security feature which uses light-polarizing effects, namely a layer 16 of nematic liquid crystals applied in motif form. For the alignment of the liquid crystals either the transfer substrate, for example a foil of PET, can be suitably structured, for example by etching or scratching, or there can be provided a separate alignment layer between the transfer substrate and the liquid crystal layer 16. On the liquid crystal layer 16 there is located an embossing lacquer layer 4 in which is embossed a diffraction structure 5. The diffraction structure has first areas 5' and second areas 5", the first areas 5' having first picture elements and the second areas 5" second picture elements. The picture elements of the second areas 5" are embossed within the picture elements of the first areas 5' and produce a second representation 7 which a viewer cannot perceive without aids, while the picture elements of the first areas 5' produce a first representation 6 which a viewer can visually perceive under ambient conditions.

On the embossing lacquer layer 4 there is located a metallization 8, for example a layer of aluminum, iron, copper, gold, nickel, etc applied by physical vapor deposition. The metallization 8 has interruptions 8'. As a further optical security feature, the security element 2 has a thin-film structure 17, i.e. a security feature with color-shift effect. The thin-film structure 17 is connected with the metallization 8 via a layer 18 of lining adhesive. For the adhesive bonding of the security element 2 to a card layer, onto the layer 17 having color-shift effect there is applied an adhesive layer 9.

The FIGS. 7 to 9 illustrate procedures for manufacturing a card 1 according to the invention, i.e. in particular the procedure for embedding a security element 2 between two card layers 21, 22 of the card 1. In FIG. 7 there is represented the transfer of a simple security element 2 onto a first card layer 21. The security element 2 consists of, as already described several times, an embossing lacquer layer 4 with an embossed diffraction structure 5, which has first relief areas 5' and second relief areas 5", whereby in the shown example the first and second relief areas 5', 5" coincide, i.e. the first and second picture elements of the diffraction structure are disposed substantially in the entire area of the embossing lacquer layer 4 of the security element 2. I.e., upon exposing the embossing lacquer layer to light suitable in each case, the open or hidden picture information can be produced and made visible to the viewer in the entire relief area 5', 5'. The diffraction structure 5 is provided with a metallization 8. The security element 2 is built up on a transfer substrate 3, and the embossing lacquer layer 4 at the same time is formed as a release layer. For the adhesive bonding with the layer structure of a card, onto one of the main surfaces 12, 13 of the security element there is applied the metallization 8, an adhesive 9, preferably by gravure printing.

The adhesive is a physically drying adhesive or an adhesive crosslinkable by heat, preferably water-based. For the adhesive bonding with a card layer, the security element 2 with the adhesive layer 9 is placed on the corresponding card layer and adhesively bonded to the card layer under light pressure, in the case of an adhesive crosslinkable by heat also under heat. Typically, the card material and the security element are present in the form of continuous webs, which are brought together in a suitable manner and adhesively bonded to each other, for example in a roller gap. The transfer substrate 3 is usually pulled off during the transfer process. In the case of physically drying adhesives, it may be necessary to wait till the adhesive has dried before further processing.

The security element 2 adhesively bonded to a first card layer 21 will now be adhesively bonded to a second card layer 22 and thus integrated into the layer structure of the card 1. In FIGS. 8 and 9, this integration is illustrated, the security element 2 being represented only schematically in each case.

FIG. 8 shows the security element 2, which is adhesively bonded to a first card layer 21 by means of an adhesive layer 9, onto the second main surface 13 of which was applied a second adhesive layer 10, for example by gravure printing. The adhesive of the second adhesive layer 10 is also a physically drying adhesive or an adhesive crosslinkable by heat, preferably water-based. The security element 2 provided with the second adhesive layer 10 is now brought together with the second card layer 22 and adhesively bonded under light pressure. In the case of a physically drying adhesive, subsequently, the first card layer 21 and the second card layer 22 are laminated with each other using a conventional lining method under elevated pressure and elevated temperature. In the case of an adhesive crosslinkable by heat, the adhesive bonding of the security element 2 with the second card layer 22 and the lamination of the card layers 21, 22 can be carried out at the same time. In the area of security element 2 there can be chosen more careful lamination conditions, i.e. a lower pressure and a lower temperature, without having to fear that the composite strength is impaired thereby. It is also possible that in the entire card area the same lamination conditions are applied.

Alternatively, the second adhesive layer 10, as shown in FIG. 9, can also be applied onto the second card layer 22, the application surface preferably being slightly larger than the size of the security element 2, in order to compensate for any inaccuracies when bringing together the layers to be adhesively bonded. Apart from that, the process is as explained in connection with FIG. 8. The second adhesive layer 10 can alternatively also be applied all-over onto the second card layer 22. In this case, it is possible for the first card layer 21 and the second card layer 22 to be particularly carefully adhesively bonded.

The second card layer 22 covering and protecting the security element 2 is preferably a transparent foil. The foil must be transparent at least in the area of the security element 2. According to a preferred embodiment, the second card foil 22 is printed with a pattern 30 all-over on its surface which is to be connected with the security element 2 or with the first card foil 21, as shown in FIG. 8, or at least in an area overlapping with the security element 2, as shown in FIG. 9. The viewer sees a design that extends without interruptions over the security element 2 and the neighboring card surface. In FIG. 1, the design is represented as a wave pattern. Instead of the design print or in addition to the design print, there can be applied a print with feature substances which are preferably visible only under UV light or IR light and in daylight are not perceived by the viewer.

The adhesive bonding, according to the invention, of the security elements allows for the first time to laminate security elements with highly sensitive relief structures, such as the relief structures which produce "hidden" representations, into a multilayer card, without the highly sensitive relief structures being damaged during the lamination of the card. Surprisingly, through the adhesive bonding with the adhesives used according to the invention, even the visibility of optical security features and the detectability of the hidden representation are improved. Altogether, this achieves an increased forgery proofness. The security element with a security feature, which produces a hidden representation and is preferably provided with additional optical security features, its embedding into the layer structure of a card by means of the use, according to the invention, of a special adhesive which improves the recognizability and detectability of the security features, on the one hand, and improves the anchoring of the security element in the layer structure of the card, on the other hand, in synergistic interaction result in a card with significantly improved forgery proofness compared to known cards.

The invention claimed is:

1. A card usable as a value card, comprising:
several layers laminated with each other, wherein between a first card layer and a second card layer there is embedded a security element comprising a plastic or lacquer layer with a relief structure and two main surfaces;
said relief structure having first relief areas comprising first picture elements and second relief areas comprising second picture elements, wherein the picture elements of the first relief areas produce a first representation visually recognizable under ambient conditions, and the picture elements of the second relief areas produce a second representation visually not recognizable under ambient conditions;
said security element being adhesively bonded by a first adhesive layer to the first card layer and by a second adhesive layer to the second card layer, wherein the first and the second adhesive layers comprise an adhesive which is the same as or different from each other and comprise an adhesive selected from the group consisting of physically drying adhesives and adhesives crosslinkable by heat; and
wherein, if at least one of the adhesives is an adhesive crosslinkable by heat at a crosslinking temperature, the crosslinking temperature of the adhesive is lower than the softening temperature of the plastic or the lacquer layer of the security element.

2. The card according to claim 1, wherein a softening temperature of the plastic or the lacquer layer of the security element is higher than the softening temperature of the first and the second card layer.

3. The card according to claim 1, wherein the security element comprises as a further security feature a layer with color-shift effect.

4. The card according to claim 3, wherein the security element comprises a lining layer for the connection with the layer with color-shift effect.

5. The card according to claim 1, wherein the security element comprises as a further security feature a light-polarizing layer.

6. The card according to claim 1, wherein the relief structure of the plastic or lacquer layer comprises an embossed hologram.

7. The card according to claim 1, wherein the relief structure of the plastic or lacquer layer comprises a metallic coating.

8. The card according to claim 1, wherein the first and/or the second adhesive layer comprises feature substances.

9. The card according to claim 1, wherein the first and/or the second adhesive layer is applied onto a primer layer.

10. The card according to claim 1, wherein the first or the second card layer is an outer layer of the card, and the outer layer on its inner surface is provided, at least in an area partially overlapping with the security element, with a pattern and/or with a layer which contains feature substances.

11. The card according to claim 1, wherein the value card is a credit card, an ID card, or a bank card.

12. A method for manufacturing a card usable as a value card, the card having several layers laminated with each other, wherein between a first card layer and a second card layer there is embedded a security element which has a plastic or lacquer layer with a relief structure, comprising the steps:
   a) manufacturing the security element having two main surfaces using the steps comprising:
   embossing the relief structure in the plastic or lacquer layer, so that in first relief areas there are embossed first picture elements which produce a first representation visually recognizable under ambient conditions, and in second relief areas embossing second picture elements which produce a second representation visually not recognizable under ambient conditions;
   b) applying a first adhesive layer onto one of the two main surfaces of the security element and adhesively bonding the security element to the first card layer;
   c1) applying a second adhesive layer onto the other of the two main surfaces of the security element; or
   c2) applying a second adhesive layer onto the second card layer at least in an area congruent with the security element to be embedded; and
   d) adhesively bonding the security element, which is adhesively bonded to the first card layer, to the second card layer, and connecting the first and second card layer with each other;
   e) wherein the first and the second adhesive layers are selected from the group consisting of physically drying adhesives and adhesives crosslinkable by heat; and
   f) wherein, when as at least one of the adhesives there is chosen an adhesive crosslinkable by heat, the adhesive so chosen has a crosslinking temperature that is lower than the softening temperature of the plastic or lacquer layer of the security element in which the relief structure was embossed.

13. The method according to claim 12, wherein the security element is formed as a transfer element having a transfer substrate, and after step b) the transfer substrate is removed.

14. The method according to claim 12, wherein for the adhesive bonding in step d) there is chosen an adhesive crosslinkable by heat, and the adhesive bonding of the security element to the second card layer and the connection of the first and the second card layer with each other is carried out at the same time under elevated temperature and elevated pressure.

15. The method according to claim 12, wherein for the adhesive bonding in step d) there is chosen a physically drying adhesive, and after the drying of the adhesive the first and the second card layer are connected by lamination under elevated temperature and elevated pressure.

16. The method according claim 12, wherein the security element is provided with at least one further feature layer, said layer having color-shift effect and/or a light-polarizing layer.

17. The method according to claim 12, wherein the relief structure of the security element is formed as an embossed hologram and is provided with a metallic coating.

18. The method according to claim 12, wherein the layer of the first and the second card layer that lies outermost in the layer structure of the finished card is provided before lamination on its surface, which is toward the inside in the finished card, with a pattern and/or with a layer which contains feature substances.

19. The method according to claim 12, wherein the value card is a credit card, an ID card, or a bank card.

* * * * *